United States Patent [19]
Stephens et al.

[11] Patent Number: 5,882,177
[45] Date of Patent: Mar. 16, 1999

[54] APPARATUS AND PROCESS FOR THE CONTAINER LOADING OF MOTOR VEHICLES

[75] Inventors: Edgar Stephens, Alameda; Edgardo Labra, Vallejo; Efren Sanchez, San Carlos, all of Calif.

[73] Assignee: Matson Navigation Company, Inc., San Francisco, Calif.

[21] Appl. No.: 826,455

[22] Filed: Mar. 27, 1997

[51] Int. Cl.$^6$ .................................................. E04H 6/06
[52] U.S. Cl. .............................. 414/800; 188/32; 410/9; 410/30; 414/228; 414/430
[58] Field of Search .................... 414/786, 227, 414/228, 233, 234, 426, 430, 498, 500, 800, 812; 188/32; 410/9, 16, 19, 30

[56] References Cited

U.S. PATENT DOCUMENTS

| | | | |
|---|---|---|---|
| 834,146 | 10/1906 | Lewis | 414/430 |
| 2,414,383 | 1/1947 | Merriam | 414/430 |
| 2,521,088 | 9/1950 | Phelps | 410/19 X |
| 2,552,804 | 5/1951 | Morris | 414/430 |
| 3,224,611 | 12/1965 | Smuck | 414/430 |
| 3,580,627 | 5/1971 | Underwood et al. | 410/30 X |
| 3,675,795 | 7/1972 | Dluhy | 414/227 X |
| 4,121,788 | 10/1978 | McMahon | 414/430 X |
| 4,310,271 | 1/1982 | Canellis et al. | 410/30 X |
| 4,913,459 | 4/1990 | Smeitink | 414/430 X |
| 5,743,689 | 4/1998 | Schlaeger | 410/30 X |

FOREIGN PATENT DOCUMENTS

| | | | |
|---|---|---|---|
| 1264970 | 3/1968 | Germany | 414/430 |
| 355178 | 8/1961 | Switzerland | 410/30 |
| 758682 | 10/1956 | United Kingdom | 414/228 |

*Primary Examiner*—David A. Bucci
*Attorney, Agent, or Firm*—Townsend and Townsend and Crew

[57] ABSTRACT

Wheel skids are utilized to load, maintain, and thereafter unload vehicles to and from a container. Preferably, paired separate skids are designed to receive and trap the front steering wheels of a vehicle. Each skid includes a wheel supporting surface, and a forward bumper surface for stopping the forward rolling wheel. A rear upward folding ramp first permits the wheel of the vehicle to roll onto the skid and then folds upward for trapping the wheel. Trapping of the wheel occurs between the forward bumper and rear upward folded ramp. Side skid members contact the side of the container during sliding movement of the skid on the bottom of the container. In operation, the skids are placed just inside the front of a container, usually just beyond the end of an auto loading ramp that allows the vehicle to easily enter the container at the front steering wheels. The vehicle is started, battery may be disconnected, hood closed, and driven onto the skids until collision with the forward bumpers occurs. The driver then stops, sets the parking and wheel brake to prevent vehicle rolling, turns off the motor, exits, and locks the vehicle. Thereafter, the rear of the vehicle is lifted and advanced into the container. The skids slide interior of the container spacing the front wheels from the sides of the container until full loading of the vehicle within the container occurs.

4 Claims, 5 Drawing Sheets

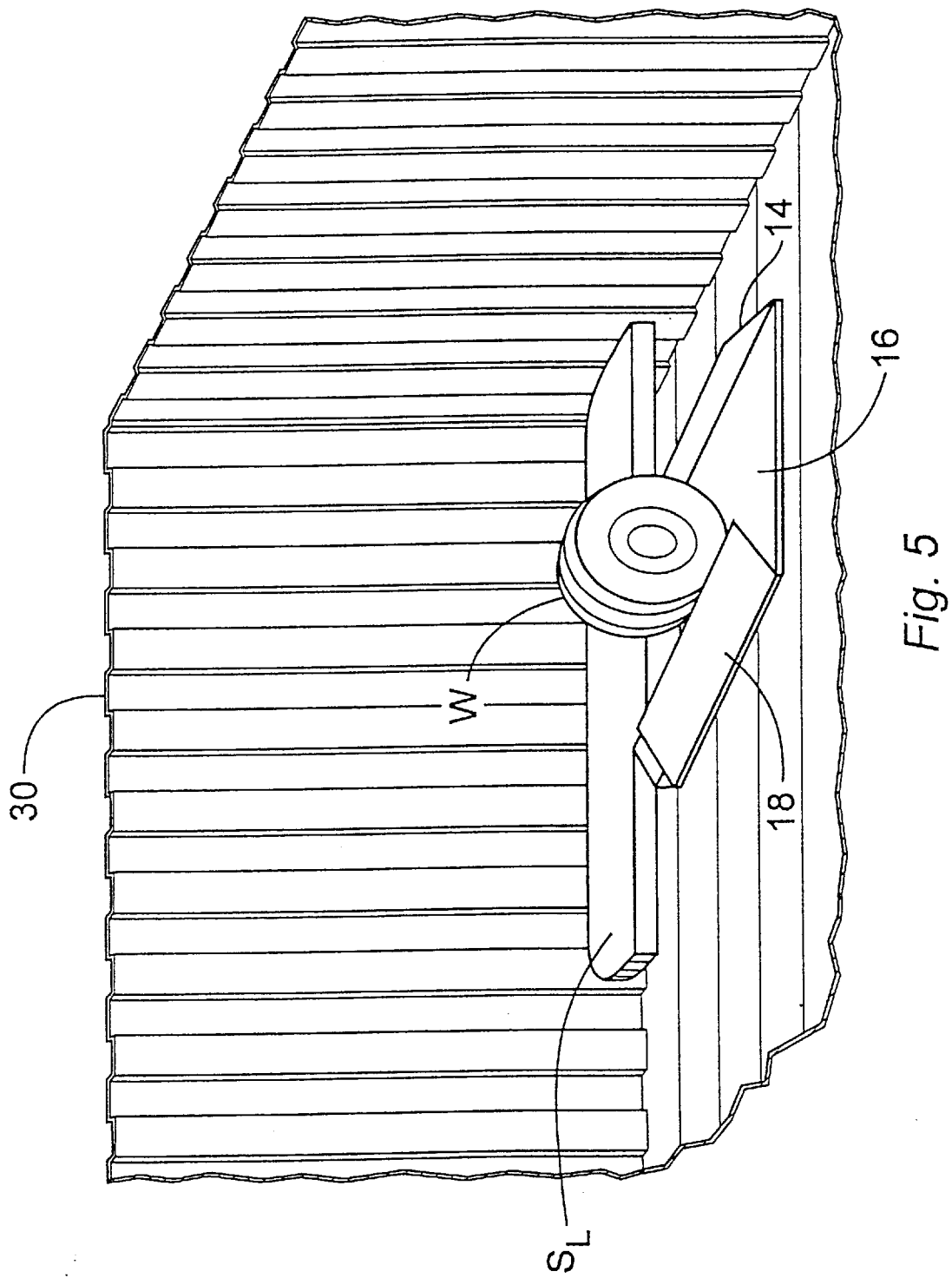

APPARATUS AND PROCESS FOR THE CONTAINER LOADING OF MOTOR VEHICLES

This invention relates to the loading of motor vehicles into standard cargo containers or other confined spaces. Specifically, front wheel skids are applied to the motor vehicle at the entrance of the container or other confined space. Thereafter, the rear wheels of the vehicle are lifted and the vehicle pushed forward from the rear wheels. Vehicle movement into the container or other confined space occurs by the skids at the front wheels moving over the supporting surface of the container or other confined space. The disclosed skids dispose the front end of the vehicle stationary in the interior of the container or other confined space away from the sidewalls, minimizing the possibility of vehicle damage during transport.

BACKGROUND OF THE INVENTION

Loading a vehicle in a container presents problems. First, regulatory provisions may require that the vehicle when enclosed within the container have its battery disconnected from the electrical system, inhibiting the ability to drive the vehicle in and out of the container.

Second, entering and exiting a vehicle once driven into the container can be difficult—if not impossible. Taking the case of a large sedan or so-called mini-van, and presuming that the vehicle can be driven fully into the container, it is not possible for the driver to conventionally exit. Simply stated, the sides of the container prevent the driver from opening the vehicle door and exiting through the vehicle door. With respect to smaller vehicles where there is enough room to open the door, the limited space often causes damage to the door as it is opened, striking the side of the container.

Third, presuming that the vehicle is driven or is pushed driverless into the container, it has been found that steering errors or the natural play of the steering wheels can cause the vehicle to collide with the sides of the container. Unacceptable body damage results.

SUMMARY OF THE INVENTION

Wheel skids are utilized to load, maintain, and thereafter unload vehicles to and from a container. Preferably, paired separate skids are designed to receive and trap the front steering wheels of a vehicle. Each skid includes a wheel supporting surface, a forward hinged bumper surface for stopping the forward rolling wheel and a rear hinged folding ramp which permits the wheel of the vehicle to roll onto the skid and then is folded upward for trapping the wheel between the forward bumper and rear folded ramp. Skid side members contact the side of the container during sliding movement in and out of the container. The skids have a low friction bottom for sliding. In operation, the skids are placed just inside the open doors of a container, usually just beyond the end of an auto loading ramp that allows the vehicle to easily enter the container opening. The vehicle is started, the battery may be disconnected; hood closed, and the vehicle driven onto the skids until contact with the forward bumpers occurs. The driver then stops, turns off the engine, sets the parking brake to prevent vehicle rolling, exits, and locks the vehicle. Thereafter, the rear of the vehicle is lifted and pushed into the container with a commercially available vehicle lift device attached to a forklift truck. The skids slide into the interior of the container guiding and spacing the front wheels from the sides of the container until full loading of the vehicle within the container occurs. Bracing may be added to prevent further movement.

BRIEF DESCRIPTION OF THE DRAWINGS

Other objects, features and advantages of this invention will become apparent after referring to the specification and attached drawings in which.

DESCRIPTION OF THE PREFERRED EMBODIMENT

Figure 1A:
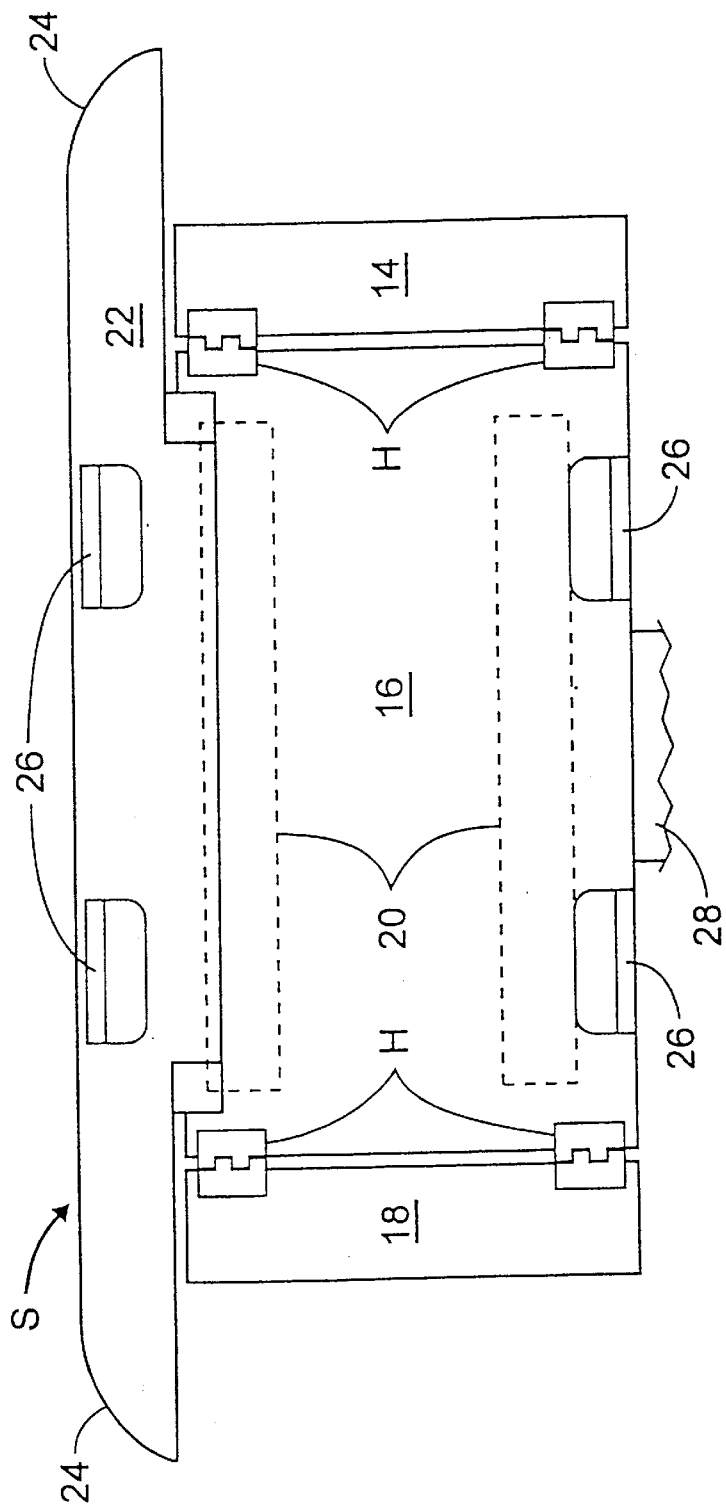
FIGS. 1A and 1B are a respective plan view and side elevation of the skid.
Figure 1B:
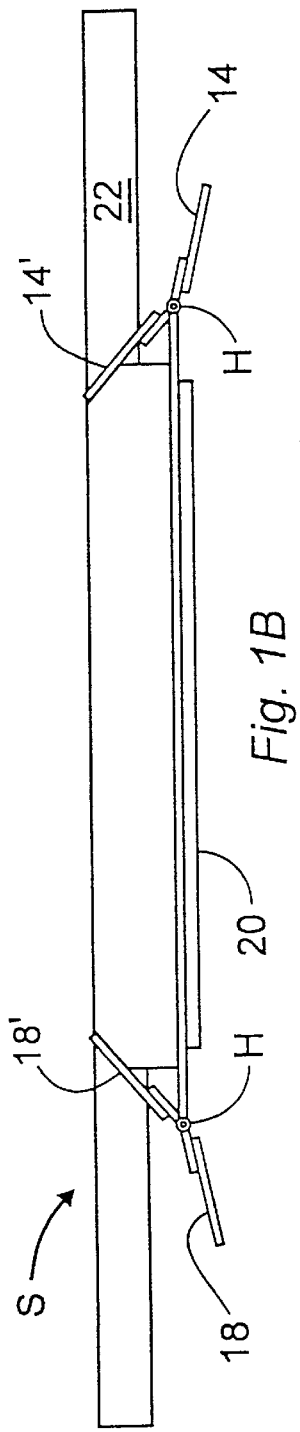

Referring to FIGS. 1A and 1B, skid S is illustrated. It includes first hinged ramp 14, wheel supporting surface 16, and second hinged ramp 18. Wheel supporting surface 16 in turn is supported on low friction pads 20 which are conventionally bolted in attachment. Raised bumper 22 attaches to wheel supporting surface 16 at one side and has gathering surfaces 24 at either end. For convenience of handling, hand grips 26 are placed at either side of skid S.

As an option, two skids S can be interconnected; this however is not preferred as it complicates handling. Such an interconnecting structure 28 is partially illustrated in FIG. 1A.

It will also be observed that left skid $S_L$ and right skid $S_R$ are constructed identically; these skids only differ in that they are reversed with respect to vehicle V within container C. Thus, on the right side of vehicle V, first hinged ramp 14 on right skid $S_R$ is toward vehicle V. When the skid of the identical configuration is used on the left side of vehicle V, the skid must be rotated 180°. Thus, second hinged ramp 18 on left skid $S_L$ is toward vehicle V.

First hinged ramp 14 and second hinged ramp 18 both fold relative to wheel supporting surface 16. These ramps fold from a first position for allowing rolling exit and entry of a wheel onto wheel supporting surface 16 to a second upward position illustrated at 14', 18' where stops applied to hinges H allow the ramps to form a 40° angle with wheel supporting surface 16. When the ramps are in the second upward position, a wheel between the two ramps is trapped. It is to be noted that the preferred embodiment does not include a locking mechanism for the ramps; the interaction of the wheel against the 40° hinge stop is sufficient for trapping of the wheel.

Having set forth the simple construction of the ramps, their operation in loading a vehicle into a container can be easily understood.

Figure 2:
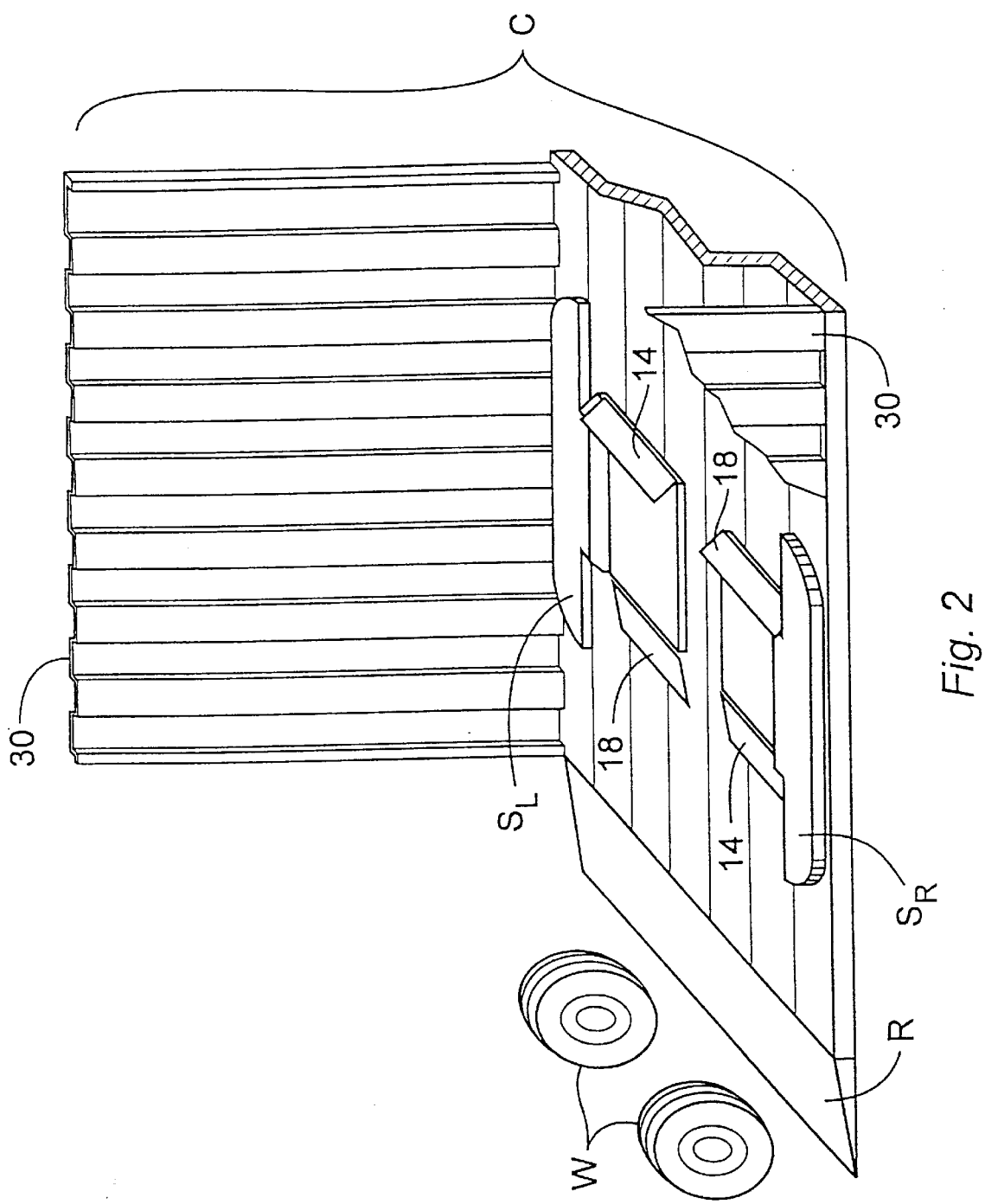
FIG. 2 is a perspective view of the left and right skids showing schematically the open end of a conventional shipping container, ramp, and wheel location.

Referring to FIG. 2, right skid $S_R$ and left skid $S_L$ (these skids being identical in construction) are placed just inside container C with side walls 30 of container C only being partially shown. Ramp R enables vehicle V at front wheels W to be loaded (See FIGS. 3 and 4 for vehicle V). Respective second hinged ramp 18 on right skid $S_R$ and first hinged ramp 14 on left skid $S_L$ are raised forming a forward rolling barrier for front wheels W of vehicle V.

Figure 3:
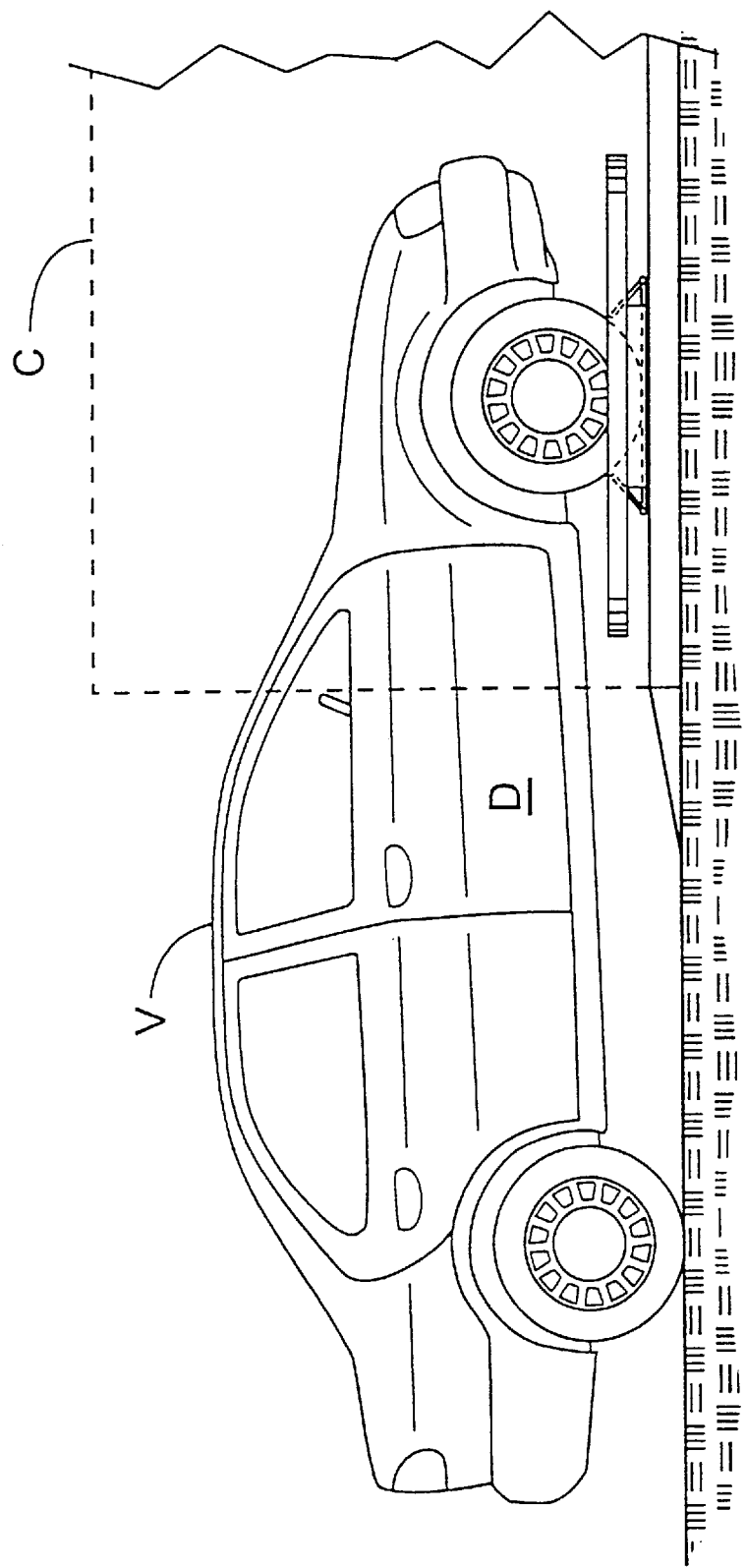
FIG. 3 is a side elevation of a vehicle resting on the skids of FIG. 2 with a wheel against the front barrier, locked at the rear folded ramp, the hood closed, engine stopped and vehicle locked; and, FIG. 4 is a side elevation similar to FIG. 3 illustrating the free vehicle end elevated and the vehicle being pushed forward in the container using a commercially available vehicle towing apparatus and the vehicle about to be positioned for shipping; and, FIG. 5 is a detail of the skid at the front of the container illustrating the limiting of skid motion provided by the container sides.

Referring to FIGS. 2 and 3 simultaneously, vehicle V is started and its battery (not shown) may be disconnected.

Thereafter, vehicle V is driven over ramp R into container C until front wheels W pass up hinged ramp 14, 18. This continues until the driver feels wheel contact with hinged ramps 18, 14 elevated at end of the skids S.

At this point, vehicle V has front wheels W within container C but car door D is at least partially exterior to the container as shown in FIG. 3. Upon exit, the driver locks raises hinged ramps 14, 18 trapping the vehicle V wheels.

Figure 4:
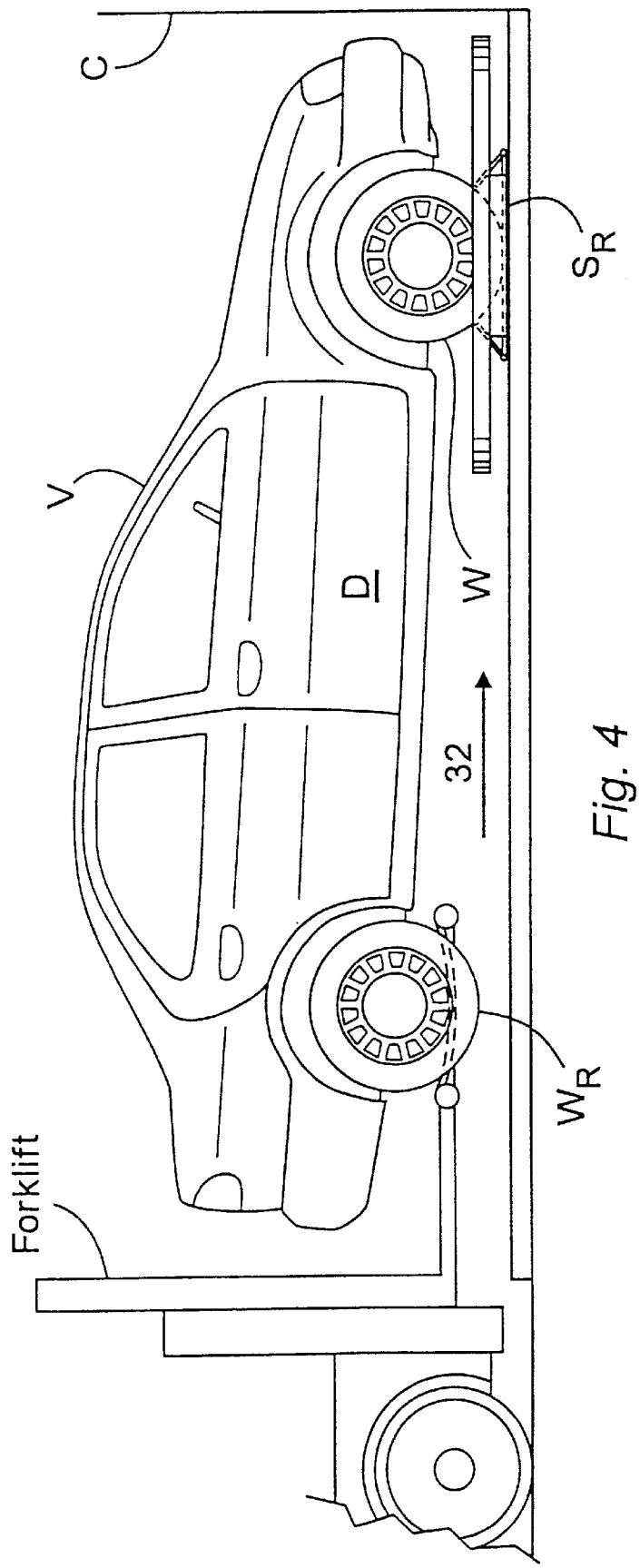

Referring to FIG. 4, conventional forklift L with commercial wheel lift attachment lifts and pushes vehicle V forward in loading direction 32 interior of container C. During this process, right skid $S_R$ and left skid $S_L$ are held juxtaposed against side walls 30 of container C. In the case of each skid, raised bumper 22 slides along and registers to side walls 30. When sufficient forward penetration of vehicle V occurs, the movement is stopped.

At this point, vehicle V is lowered and released from conventional forklift with wheel lift attachment. Bracing is conventionally included, as necessary, around the vehicle wheels to prevent further movement. It will be understood that multiple vehicles may be loaded within a container dependent upon container length and vehicle size. Once container C is fully loaded, it is conventionally transported.

It will be understood that unloading is the reverse of loading; further explanation will not be tendered.

In the claims that follow, we utilize the word "container." It will be understood that in the usual case, this term applies to conventional cargo containers such as those utilized for overseas marine transport. This term will be understood to apply also to other confined spaces where transport may well have to occur. For example, the container could be the inside of an aircraft, an enclosed truck trailer or any confined space into which loading is desired.

What is claimed is:

1. A process of loading a vehicle having paired front wheels and at least paired rear wheels into a container onto a container bottom through a container opening between container sides spaced apart with a width from one another that prevents or restricts opening of doors of the vehicle to permit normal exit of a driver within the container, the process comprising the steps of:

providing first and second skids for each receiving one of the paired front wheels of a vehicle, the first and second skids having a bottom surface for sliding movement over an inside bottom surface of a container, a side surface for contacting an inside of the container with the vehicle spaced apart from the container sides; and each of the skids extending to support only one front wheel of the vehicle;

placing the first and second skids just inside the container opening between the container sides with each skid positioned to receive one of the pair front wheels;

driving the vehicle to position the paired front wheels of the vehicle onto the skids;

exiting the vehicle at a door at least partially exterior of the container;

locking wheels of the vehicle on the skids;

moving the vehicle forwardly by raising the vehicle at the paired rear wheels and pushing the vehicle forward at the paired rear wheels to cause the skids to slide over the container bottom to place the vehicle within the container; and, lowering the paired rear wheels of the vehicle to the container bottom to rest the vehicle with the paired front wheels locked to the skids and the paired rear wheels on the container bottom.

2. A process of loading a vehicle into a container according to claim 1 and wherein:

the first and second skids include folding ramps moveable from a first position permitting rolling entry of a wheel to the skid to a second position for locking the wheel to the skid; and, the locking step includes folding one of the ramps.

3. A skid for maintaining a vehicle wheel on a container bottom within a container spaced apart from sides of a container, the skid comprising in combination:

a bottom sliding member for low friction sliding movement over the container bottom, top wheel supporting member extending in the proximity of a single wheel and not extending for support of adjacent wheels, a forward stop for arresting forward rolling motion of a wheel on a vehicle, and, a rear folding ramp for pivotal folding movement between a first position for permitting a vehicle wheel to be driven onto the top wheel supporting member and a second position folding the rear folding ramp against the vehicle at an edge thereof to maintain the vehicle wheel on the skid, and, side bumpers for contacting the sides of the container to limit movement of the vehicle with respect to the sides of the container.

4. A process of loading a vehicle having paired front wheels and paired rear wheels into a container on the container bottom through a container opening between container sides spaced apart with a width from one another that prevents opening of doors of the vehicle to permit normal exit of a driver within the container, the process comprising the steps of:

providing first and second skids, each said skid having, bottom sliding member,
      top wheel supporting member extending to support a single wheel and not extending for support of adjacent wheels,
      a forward stop for arresting forward rolling motion of a wheel on a vehicle, and,
      a rear folding ramp for permitting a vehicle wheel to be driven onto the top wheel supporting member and folding the rear folding ramp to maintain the vehicle wheel on the skid, and,
      side bumpers for contacting the container sides of the container;

placing the first and second skids just inside the container, opening at the container sides with the rear folding ramp positioned to permit a vehicle wheel to be driven onto the wheel supporting member of the rear folding ramp;

driving a vehicle at a first end with the paired front wheels of the vehicle passing only onto the skids;

exiting the vehicle at a door at least partially exterior of the container;

folding the rear folding ramp to lock the front wheel on the top wheel supporting member;

moving the vehicle forwardly by raising the paired rear wheels to cause the skids supporting the paired front wheels to slide over the container bottom to place the vehicle within the container; and, placing the paired rear wheels directly on the container bottom to support the vehicle within the container.

* * * * *